(12) United States Patent
Harbottle et al.

(10) Patent No.: US 6,357,922 B1
(45) Date of Patent: Mar. 19, 2002

(54) LUBRICATION SYSTEM FOR HIGH SPEED ANTIFRICTION BEARINGS

(75) Inventors: William E. Harbottle, Fort Lauderdale, FL (US); Tadao Tsuneyoshi, North Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/514,568

(22) Filed: Feb. 24, 2000

(51) Int. Cl.[7] ............................................. F16C 33/66
(52) U.S. Cl. ....................... 384/466; 384/468; 384/474
(58) Field of Search ................................. 384/462, 464, 384/466, 468, 471, 474; 184/6.26, 7.4

(56) References Cited

U.S. PATENT DOCUMENTS

| 2,841,244 A | * | 7/1958 | Sorem ........................ 384/466 |
| 3,042,462 A | * | 7/1962 | Rosskopf .................... 384/466 |
| 3,958,725 A | | 5/1976 | Reeve ........................ 222/335 |
| 4,343,378 A | | 8/1982 | Bremer | |
| 4,494,913 A | | 1/1985 | Keller ........................ 417/349 |
| 4,759,427 A | | 7/1988 | Onose et al. ............... 184/6.26 |
| 4,785,913 A | | 11/1988 | Maurer et al. ............. 184/6.26 |
| 4,932,500 A | * | 6/1990 | Smith et al. ................ 384/470 |
| 5,007,504 A | | 4/1991 | Hallbach ........................ 184/8 |
| 5,060,760 A | | 10/1991 | Long et al. | |
| 5,086,877 A | | 2/1992 | Synatschke et al. ......... 184/7.4 |
| 5,288,154 A | * | 2/1994 | Jost ............................. 384/480 |
| 5,484,212 A | | 1/1996 | Gunraldi et al. ............ 384/462 |
| 5,632,355 A | | 5/1997 | Dussault ..................... 184/7.4 |
| 5,671,825 A | | 9/1997 | Wong et al. | |
| 5,711,615 A | | 1/1998 | Stitz et al. .................. 384/473 |

FOREIGN PATENT DOCUMENTS

| DE | 19808887 | 9/1999 |
| EP | 288941 | 2/1988 |

* cited by examiner

*Primary Examiner*—Thomas R. Hannon
(74) *Attorney, Agent, or Firm*—Polster, Lieder, Woodruff & Lucchesi, L.C.

(57) ABSTRACT

A high speed antifriction bearing receives minute quantities of high performance grease or oil at selected intervals from an electrically controlled injector having a nozzle that is directed at the rolling elements of the bearing. By minimizing the lubricant in the bearing, the lubricant does not accumulate in quantities that render it susceptible to working. The high performance lubricant produces a boundary layer film between contacting critical surfaces within the bearing. That film is so thin that it has little capacity to churn or work and produce heat. The injector may be the type used for electronic injection of diesel fuel into the cylinders of diesel engines.

17 Claims, 7 Drawing Sheets

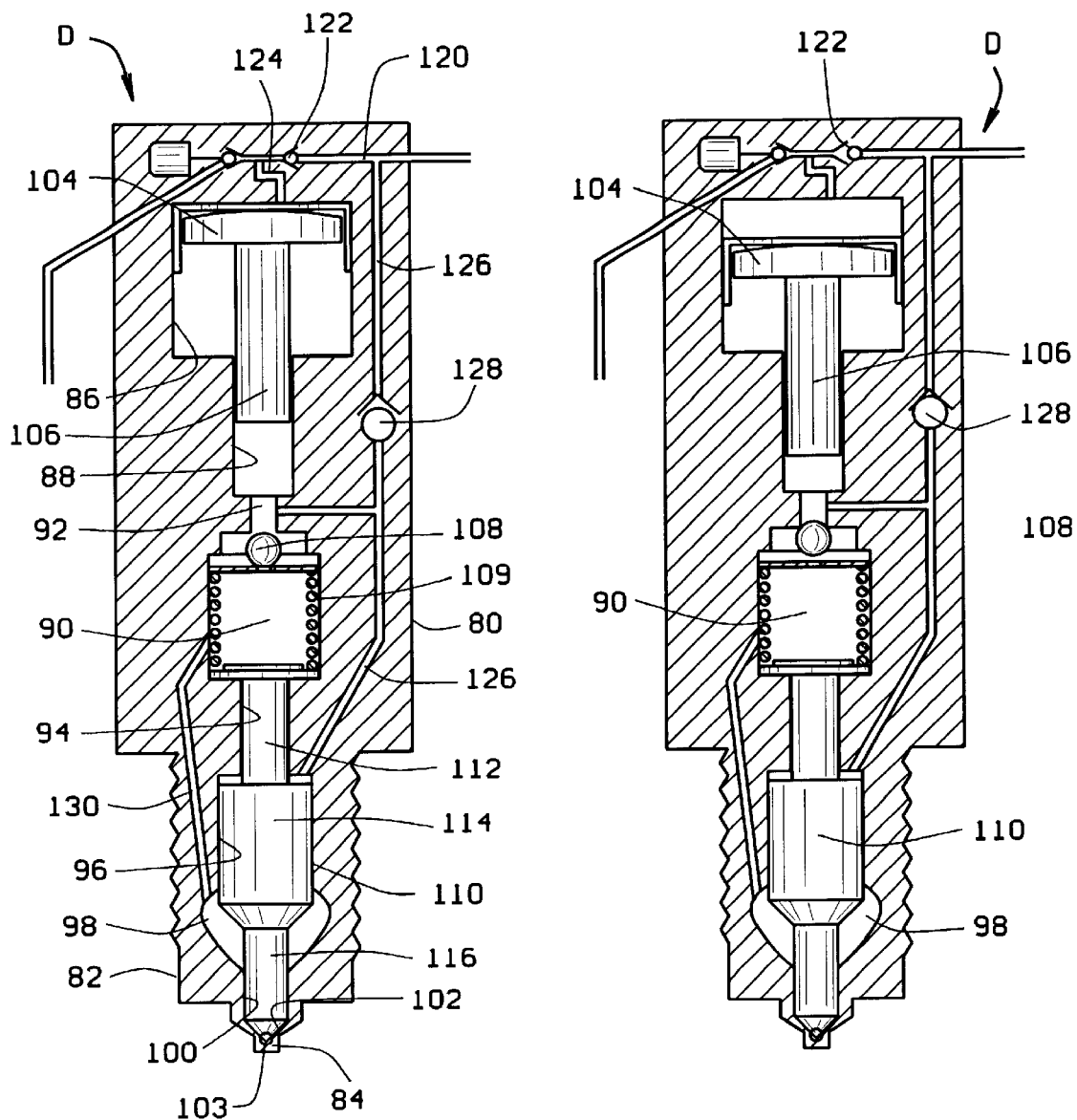
FIG. 2 (FILL)   FIG. 3 (CHARGED)

(INJECT)

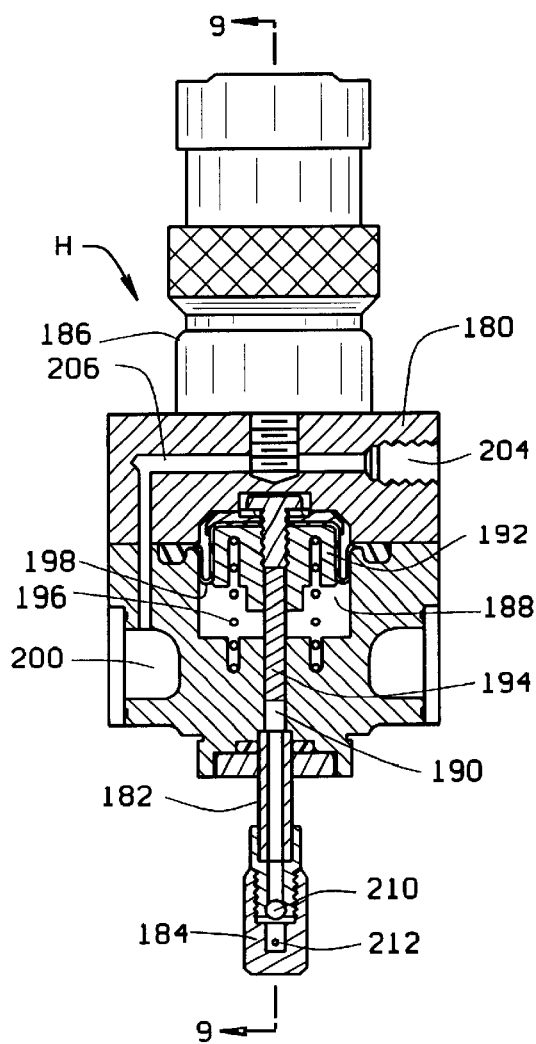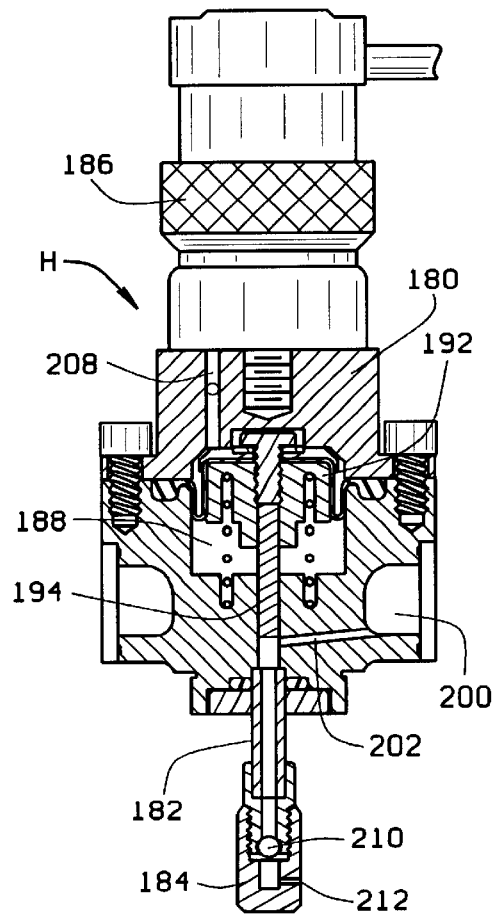
FIG. 8
FIG. 9

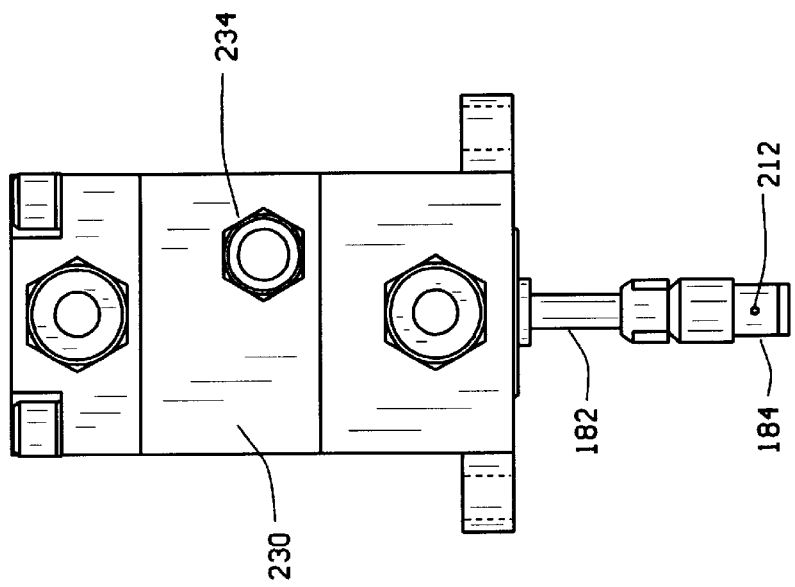
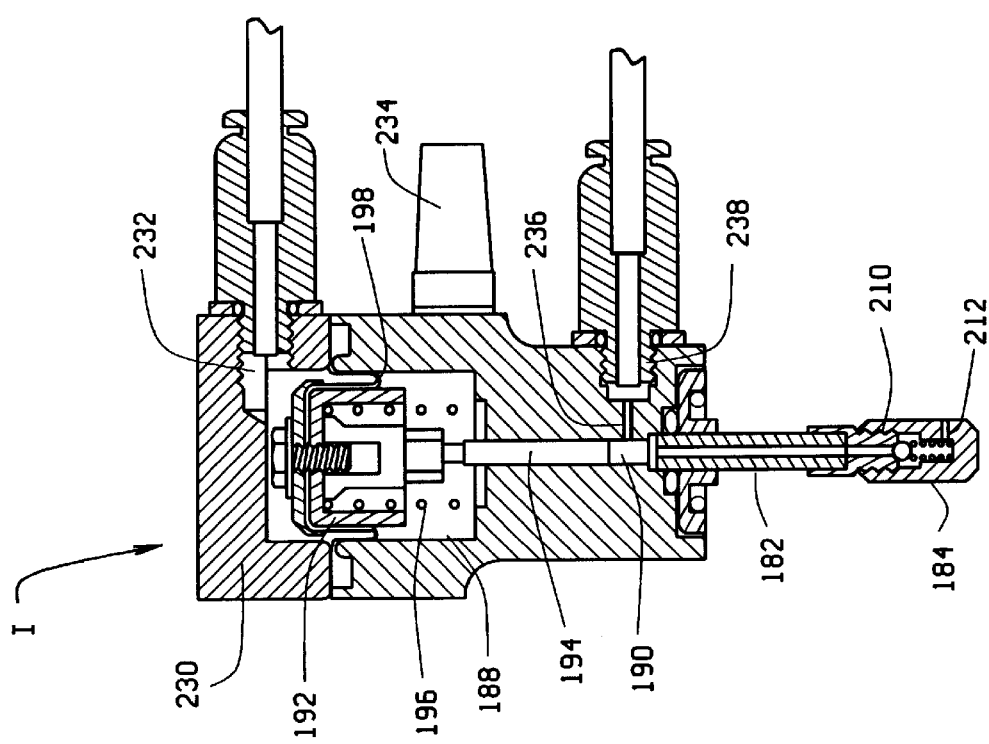
FIG. 11
FIG. 12

LUBRICATION SYSTEM FOR HIGH SPEED ANTIFRICTION BEARINGS

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to antifriction bearings, and more particularly to a system and process for lubricating such bearings.

The spindle of a precision machine tool must rotate with considerable stability; that is to say, it must not deviate from its axis of rotation. Wobble or radial and axial motion in the spindle cannot be tolerated. Angular contact ball bearings and tapered roller bearings make this possible. When the spindle is supported in a housing on a pair of either of these types of antifriction bearings, with the bearings of the pair being mounted in opposition, one of the bearings may be adjusted against the other to bring the bearings into a condition of preload. In that condition no radial or axial clearances exist within the bearings, and the spindle rotates without deviation from the axis of rotation.

In an angular contact ball bearing, the balls roll along raceways that are arcuate in cross section and generally conform to the contour of the balls. But the balls contact the raceway of the outer race in a region offset axially from the region where they contact the raceway of the inner race, so that the raceways are in a sense oblique to the axis of the bearing. This enables the bearing to carry thrust as well as radial loads. In the absence of lubrication along the raceways, scoring and welding of surface finish asperities will occur, not only along the raceways, but on the spherical surfaces of the balls as well.

In a tapered roller bearing the tapered rollers roll along tapered raceways which lie within conical envelopes having their apices at a common point along the axis of rotation. This places the rollers "on apex" so that pure rolling occurs along the raceways. Hence, little, if any, friction develops between the rollers and the tapered raceways. But the geometry of a tapered roller bearing is such that the rollers will migrate up the raceways and unless restrained will be expelled from the bearing. A thrust rib, at the large end of one of the raceways, provides the restraint. The rollers at their large end faces bear against the thrust rib and, when the bearing is set into operation, those end faces spin and slide along the face of the rib. The spinning and sliding produces friction, and unless a film of lubrication is maintained along the rib face, scoring will develop and the bearing will overheat and perhaps fail.

Standard grease provides adequate lubrication for the spindle bearings of either type, provided they rotate at moderate velocities. It costs little and may be introduced to critical surfaces through a single set of passageways. Moreover, it requires no break in. But standard grease churns at higher speeds as it passes between the rolling elements and the raceways for the bearings, and this requires work which manifests itself in the form of heat. The heat raises the temperature of the bearings. In a set of two or more bearings mounted in opposition, the heat produces temperature differentials between the housing and spindle and upsets the fine tolerances used in the manufacture of the machine tool. Circulating oil accommodates somewhat higher spindle speeds, but it requires an expensive system of pumps, filters and oil passages. Furthermore, oil likewise churns or is worked as it passes between the rolling elements and the raceways, and to dissipate the heat that is produced an oil cooler is sometimes required.

The bearings which operate at still higher speeds require more sophisticated lubrication. One is oil mist. It requires compressed air to operate a mist generator and move the mist through passageways to critical surfaces in the bearings. Compressed air does not come inexpensively. Not only must air be compressed, but it further must be dried and filtered, since it comes in contact with the critical surfaces in the bearings. Apart from that, a high speed bearing must rely on low friction seals to contain the mist, and they are not very effective in this respect. The mist escapes and coats nearby objects with a messy and slippery film. It also pollutes the surrounding atmosphere, producing what some consider to be a health hazard.

An oil-air lubrication system will also satisfy the requirements of high speed spindle bearings. This system relies on compressed air to detach oil in the form of drops from a feed pipe and direct those drops to critical surfaces in the bearing. The compressed air also cools the bearing. Unlike the oil mist system, the oil-air system does not pollute the surrounding atmosphere, for any oil that escapes remains as liquid oil, not a mist. But an oil-air system requires compressed air, which is expensive to produce, and it also requires complex tubing to deliver the oil and air to critical surfaces in the bearing.

High performance greases afford an alternative to oil-mist and oil air systems. This synthetic product, when used sparingly, provides adequate lubrication for high speed spindle bearings with very low heat generation and therefore low operating temperatures. A standard grease or oil when used as a lubricant in an antifriction bearing produces an elastrohydrodynamic (EHD) lubricant film between critical surfaces in the bearing, primarily between the raceways and the rolling elements. Here the EHD film is compressed under enormous pressure. This requires work, and, like friction, the work manifests itself in the form of heat. Indeed, tests on a tapered roller bearing have shown that in high speed operation, the working of the EHD film along the raceways consumes more energy than the friction produced along the face of the thrust rib. High performance greases produce a thinner film, sometimes referred to as "boundary layer lubrication", and this lubrication is less susceptible to working, so it produces considerably less heat, all while protecting the critical surfaces from scoring and the welding of surface finish asperities.

Moreover, a bearing lubricated with high performance grease does not require compressed air and the pumps, filters and dryers identified with it, nor does it require a complex system of ducts to deliver lubrication to critical surfaces in the bearing. Indeed, the machine tool builder simply prelubricates the bearing with a small quantity of the high performance grease.

However, the grease does not achieve its full effectiveness until it is "broken in", and this demands additional down time for the spindle and the costs associated with it. Typically protective coatings are first removed from the bearing components. Then a small quantity of high performance grease is applied to critical surfaces in the bearing. Next the bearing is operated to better distribute the grease over the critical surfaces and to evacuate unnecessary grease. Basically, the objective of the break-in is to spread the lubricant along the critical surfaces with a thickness that will not support working of the grease. In addition, the operation of the bearing during break-in forces excess grease out of the bearing components. Accordingly, the seals protecting the critical surfaces from external contaminants are installed as the final step in this process. During the break-in, which may consume a full day, the temperature of the bearing is constantly monitored to insure that it does not undergo a rapid rise. Such a rise would generally indicate one of two problems. First, the absence of adequate boundary layer lubrication along the critical surfaces would cause a rise in temperature. Secondly, work is exerted by the components in churning any excess grease, work that results in heat and a corresponding increase in temperature. Also, a spindle bearing will outlast the grease, so to derive the maximum life from the bearings, the bearing must be relubricated from time-to-time. This requires removal of the bearings from the spindle and housing, cleaning the bearings, repacking the bearings with new high performance grease and then reassembling the spindle and housing. And, of course, the new grease must be broken in.

Owing to the cost of repacking spindle bearings with new high performance grease, machine tool operators often delay this maintenance procedure for as long as possible sometimes beyond the point of failure for the grease. And when the grease in a bearing fails, the bearing usually experiences scoring along its critical surfaces.

Also, high speed bearings lubricated with high performance grease require more effective seals than those lubricated with other systems. Standard grease tends to accumulate at each seal and produce a barrier of its own to the ingress of contaminants. Both oil-air and oil mist systems maintain a slight positive pressure within the bearing, and this serves to retard the ingress of contaminants. Circulating oil tends to flush away contaminants, which are removed from the oil at filters. But a bearing lubricated with high performance grease contains very little of it, so it does not accumulate in the form of a barrier, nor does it flush away contaminants or function under a positive pressure.

BRIEF SUMMARY OF THE INVENTION

The present invention resides in the combination of an antifriction bearing and an injector for discharging minute quantities of lubricant into the bearing at selected intervals so that the bearing maintains a film of lubricant over its critical surfaces, but does not have lubricant accumulate within it. The invention also resides in a process for lubricating an antifriction bearing by directing minute quantities of lubricant into it at selected intervals based on feedback from monitored system operating parameters, such as bearing temperature, speed, and running time subsequent to an injection of lubrication. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur:

FIG. 2 is a schematic view in section of the injector of FIG. 1 in its fill mode;

FIG. 3 is a schematic view in section of the injector in its charged mode;

FIG. 8 is a sectional view of the injector of FIG. 7;

FIG. 9 is a sectional view of the injector taken along line 9—9 of FIG. 8;

FIG. 11 is a sectional view of another modified injector; and

FIG. 12 is an elevational view of the injector of FIG. 11.

Corresponding reference numerals will be used throughout the several figures of the drawings.

DETAILED DESCRIPTION OF THE INVENTION

Figure 1:
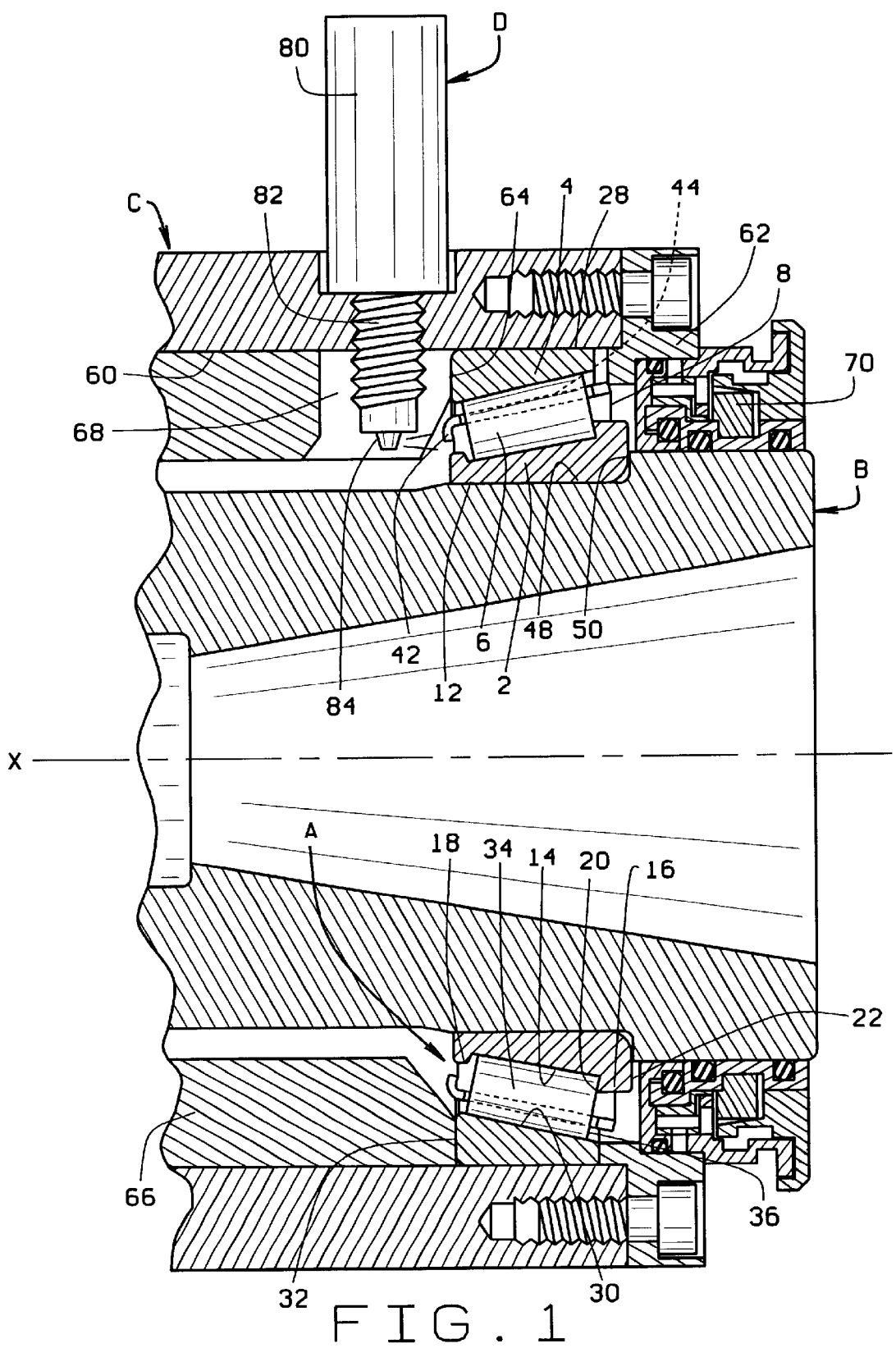
FIG. 1 is a sectional view of a spindle supported in a housing on a tapered roller bearing, with the bearing receiving its lubrication from an injector, all in accordance with and embodying the present invention.

Referring now to the drawings, a single row of tapered roller bearings A (FIG. 1) supports a spindle B in a housing C and enables the spindle B to rotate at extremely high velocities about its axis X which also represents the axis of the bearing A, all while generating little heat. To this end, the bearing A is lubricated with a high performance lubricant that is directed into it at selected intervals by an injector D which is mounted in the housing C. The injector D discharges just enough lubricant into the bearing A to maintain a film of boundary layer lubrication along critical surfaces of the bearing A, but not enough to produce an elastohydrodynamic (EHD) film or any significant accumulation of lubricant in the bearing A. The boundary layer film is considerably thinner than the film derived from the greases and oil that are used in conventional lubricating systems. Hence, the lubricant experiences very little working along its critical surfaces, and as a consequence generates little heat, even though the bearing A operates at high velocities. Kluber under the designation Kluber Isoflex NBU-15 sells a suitable high performance grease having an ester oil base and a barium complex thickener. Mobil Corporation sells another under the designation Mobilith SHC 15, and it has a synthetic hydrocarbon base and a lithium thickener. Both are suitable for introduction into the bearing A at the injector D. So are some low viscosity lubricating oils, such as DTE Light which is sold by Mobil Corporation.

Actually, the spindle B is supported on two single row tapered roller bearings—the one being the bearing A, which is in the nose position, and the other, which is essentially the same; being in the tail position where it is mounted in opposition to the bearing A. The other bearing is adjusted against the bearing A such that the two bearings exist in a condition of preload. As a consequence, no radial or axial clearances exist in the bearing A or the other bearing, and the axis X of the spindle B remains stable.

The bearing A includes (FIG. 1) an inner race in the form of a cone 2, an outer race in the form of a cup 4 that fits around the cone 2, and rolling elements in the form of rollers 6 located in a single row between the cone 2 and the cup 4. In addition, the bearing A has a cage 8 which also fits between the cone 2 and cup 4 to maintain the proper spacing between the rollers 6. The cone 2 fits around the spindle B, while the cup 4 fits into the housing C.

The cone 2 has a cylindrical bore 12 that extends completely through it and a tapered raceway 14 that is presented outwardly away from the bore 12 and axis X. The tapered raceway 14 lies between a thrust rib 16 and a retaining rib 18, the former being at the large end of the raceway 14 and the latter at the small end. The raceway 14 further lies within a conical envelope having its apex along the axis X. The thrust rib 16 along the large end of the raceway 14 has a rib face 20 and on its opposite end a back face 22.

The cup 4 has a cylindrical exterior surface 28, which is presented away from the axis X, and a tapered raceway 30 that is presented inwardly toward the axis X. The raceway 30 for the cup 4 surrounds the raceway 14 for the cone 2 and at its small end opens out of a back face 32 for the cup 4. The cup raceway 30 lies within a conical envelope that has its apex along the axis X at the very same location as the apex for the cone raceway 14.

The tapered rollers 6 lie in a single row between the tapered raceways 14 and 30 of the cone 2 and cup 4, respectively. Each has a tapered side face 34 and a large end face 36. The side face 34 matches the tapers of the raceways 14 and 30 and as such has essentially line contact with the raceways 14 and 30, so the envelope defined by the side face 34 likewise has its apex along the axis X at the point common to the apices for the envelopes of the raceways 14 and 30. This places the rollers 6 "on apex". The large end face 36 of each roller 6 bears against the rib face 20 of the thrust rib 16 for the cone 2, so the thrust rib 16 prevents the rollers 6 from being expelled from the space between the two raceways 14 and 30.

When the bearing A is set in operation, the rollers 6 roll along the raceways 14 and 30 of the cone 2 and cup 4, respectively. Pure rolling contact exists between the tapered side faces of the rollers 6 and the raceways 14 and 30, because the rollers 6 are on apex. The large end faces 36 of the rollers 6, on the other hand, slide and spin along the rib face 20 of the thrust rib 16. Thus, the tapered raceway 14 and the tapered side faces 34 of the rollers 6 constitute one set of critical surfaces in the bearing A, the tapered side faces 34 and the raceway 30 constitute another set, and the large end faces 36 of the rollers 6 and the rib face 20 of the thrust rib 16 constitute still another set. The high performance grease provides a film of boundary layer lubrication between the three sets of critical surfaces, and that film prevents scoring of the roller end faces 36 and rib face 20 as the end faces 36 slip and slide along the rib face 30. The boundary layer film also exists between the raceways 14 and 30 and the roller side faces 34, and being extremely thin, experiences little working.

The cage 8 not only maintains the proper spacing between the rollers 6, but it also serves to hold the rollers 6 around the cone 2 when the cone 2 and rollers 6 are withdrawn from the cup 4. The cage 8 has a large end ring 40 located around the thrust rib 16, a small end ring 42 located around the retaining rib 18 and bridges 44 connecting the two end rings 40 and 42. The bridges 44 pass between the rollers 6 and thus separate adjacent rollers 6.

The spindle B has (FIG. 1) a cylindrical bearing seat 48 that leads up to a shoulder 50 at the end of the spindle B. The cone 2 fits over the seat 48 with its back face 22 against the shoulder 50, there being an interference fit between the seat 48 and the surface of the cone bore 12.

The housing C contains a bore 60 through which the spindle B passes, and the cup 4 fits into the end of the bore 60, there being an interference fit between the surface of the bore 60 and the cylindrical exterior surface 28 of the cup 4. The very end of the bore 60 is occupied by an end ring 62 which is secured against the end of the housing C with machine screws. The end ring 62 lies against the end of the cup 4 out of which the large end of the raceway 30 opens. The back face 32 at the opposite end of the cup 4 bears against a shoulder 64 formed on the end of a spacer 66 which extends through the bore 60 to the cup of the other bearing, that is, the bearing that is mounted in opposition to the bearing A. The spacer 66 has the opening 68 that opens axially out of the shoulder 64. The end ring 62 is fitted with a seal 70 which establishes a fluid barrier with the nose of the spindle B.

The injector D is mounted on the housing C where it projects into the housing bore 60 and through an opening 68 in the spacer 66 so that it is located immediately behind the small ends of the tapered rollers 6 where it injects a minute amount of lubricant into the bearing A at selected intervals. An accumulator-type injector used for injecting diesel fuel into the cylinder of a diesel engine will suffice, as will a unit-type injector, although the latter is preferred. In any event, the injector D is electronically controlled. A diesel engine fuel injector suitable for use as the injector D is manufactured by BKM, Inc., of San Diego, Calif.

The injector D includes (FIG. 2) an elongated body 80 provided with a reduced end 82 which terminates at a nozzle 84. The reduced end 82 is threaded, while the nozzle 84 is directed laterally with respect to the end 82. Beginning at the end remote from the reduced end 82, the body 80 contains (FIG. 2) a large intensifier cylinder 86 which opens into a reduced plunger cylinder 88 which in turn opens into the end of an accumulator chamber 90 through a short passage 92. The opposite end of the accumulator chamber 90 opens into a bore 94 which extends into the reduced end 82 of the body 80 where the bore 94 opens into one end of a larger bore 96. At its opposite end the larger bore 96 merges with an enlarged chamber 98 which in turn opens into a needle bore 100 that leads to the nozzle 84. Indeed, the needle bore 100 terminates at a valve seat 102 that is located immediately ahead of the nozzle 84. Beyond the valve seat 102 the nozzle 84 has a laterally directed orifice 103.

The intensifier cylinder 86 contains an intensifier piston 104 to which a plunger 106 is attached, with the plunger 106 projecting from the intensifier cylinder 86 into plunger cylinder 88. The accumulator chamber 90, where the short passage 92 opens into it, contains an accumulator check valve 108 that is oriented to close when the pressure in the accumulator 90 exceeds the pressure in the passage 92. In addition, the accumulator chamber 90 contains a coil spring 109 which urges the check valve 108 toward its closed position and further urges a needle valve 110 toward the seat 102 at the nozzle 84. The needle valve 110 includes a stem 112 which lies within the bore 94, an enlarged intermediate portion 114 which occupies the larger bore 96 and enlarged chamber 98, and a needle 116 which extends through the enlarged chamber 98 into the needle bore 100 where it terminates at a beveled end located opposite the valve seat 102.

In addition, the body 80 contains an inlet passage 120 which is connected to a source of lubricant that is normally maintained at ambient pressure, but when an injection is required, the pressure at the source of lubricant is elevated to about 500 lbs/in$^2$. The inlet passage 120 leads to a solenoid valve 122 which controls the flow of lubricant to a supply passage 124 that leads into the end of the intensifier cylinder 86. The body 80 also contains another supply passage 126 that leads from the inlet passage 120 upstream from the solenoid valve 122. The passage 126 divides and leads both to the connecting passage 92 that is between the plunger cylinder 88 and the accumulator chamber 90 and to the larger bore 96 where the small bore 94 opens into it, thus exposing the passage 126 to the back face of the intermediate portion 114 for the needle valve 110. The supply passage 126 contains a fill check valve 128 which is located upstream from where the passage 126 divides and is oriented such that a back pressure at the divide prevents grease from flowing back to the inlet passage 120. The body 80 contains a connecting passage 130 that leads from the accumulator chamber 90 to the enlarged chamber 98 beyond the enlarged intermediate portion of the needle valve 110. Finally, the nozzle 84 is at its very end beyond the valve seat 102.

In operation, the injector D first undergoes a fill event (FIG. 2) in which the solenoid valve 122 is deenergized. Pressurized lubricant from the source flows through the inlet passage 120 to the solenoid valve 122, but there is blocked from advancing any farther. The pressurized lubricant also flows into the supply passage 126 where it passes through the fill check valve 128. Some of the lubricant flows on to the large bore 96 behind the intermediate portion 114 of the needle valve 110 in that bore 96. The remainder flows to the short passage 92 between the plunger cylinder 88 and into the accumulator chamber 90. The lubricant fills both, and in entering the latter passes through the accumulator check valve 108. Indeed, the pressurized lubricant flows from the accumulator chamber 90 through the connecting passage 130 to the enlarged chamber 98 beyond the intermediate portion 114 of the check valve 110, and fills the enlarged chamber 98 as well.

Next the injector D undergoes a charge event (FIG. 3) which is initiated by energizing the solenoid valve 122 and a vent 131. Pressurized grease flows through the open solenoid valve 122 and beyond through the supply passage 124 and into the intensifier cylinder 86, driving the intensifier piston 104 away from the end of the cylinder 86. Indeed, the intensifier piston 104 drives the intensifier plunger 106 through the plunger cylinder 88, forcing lubricant out of the plunger cylinder 88 at considerably greater pressure, owing to the difference in the diameters of the piston 104 and the plunger 106. The pressure differential closes the fill check valve 128 and opens the accumulator check valve 108, and the pressure of the lubricant in the accumulator chamber 98 and supply passage 126 increases, exerting increased pressure on the needle valve 110 and holding its needle 116 against the valve seat 102. In fact, the lubricant actually compresses in the accumulator chamber 90, thus increasing the mass of lubricant in the chamber 90. The lubricant transfer to the accumulator chamber 90 ends when a force balance develops between the intensifier plunger 106 and the intensifier piston 104. At this point the accumulator check valve 108 closes, thereby trapping lubricant in the accumulator chamber 90 at a very high pressure on the order of 6,000 lbs/in$^2$. As well, at this point, the injector D is charged, as FIG. 3 is labeled.

Figures 4, 5:
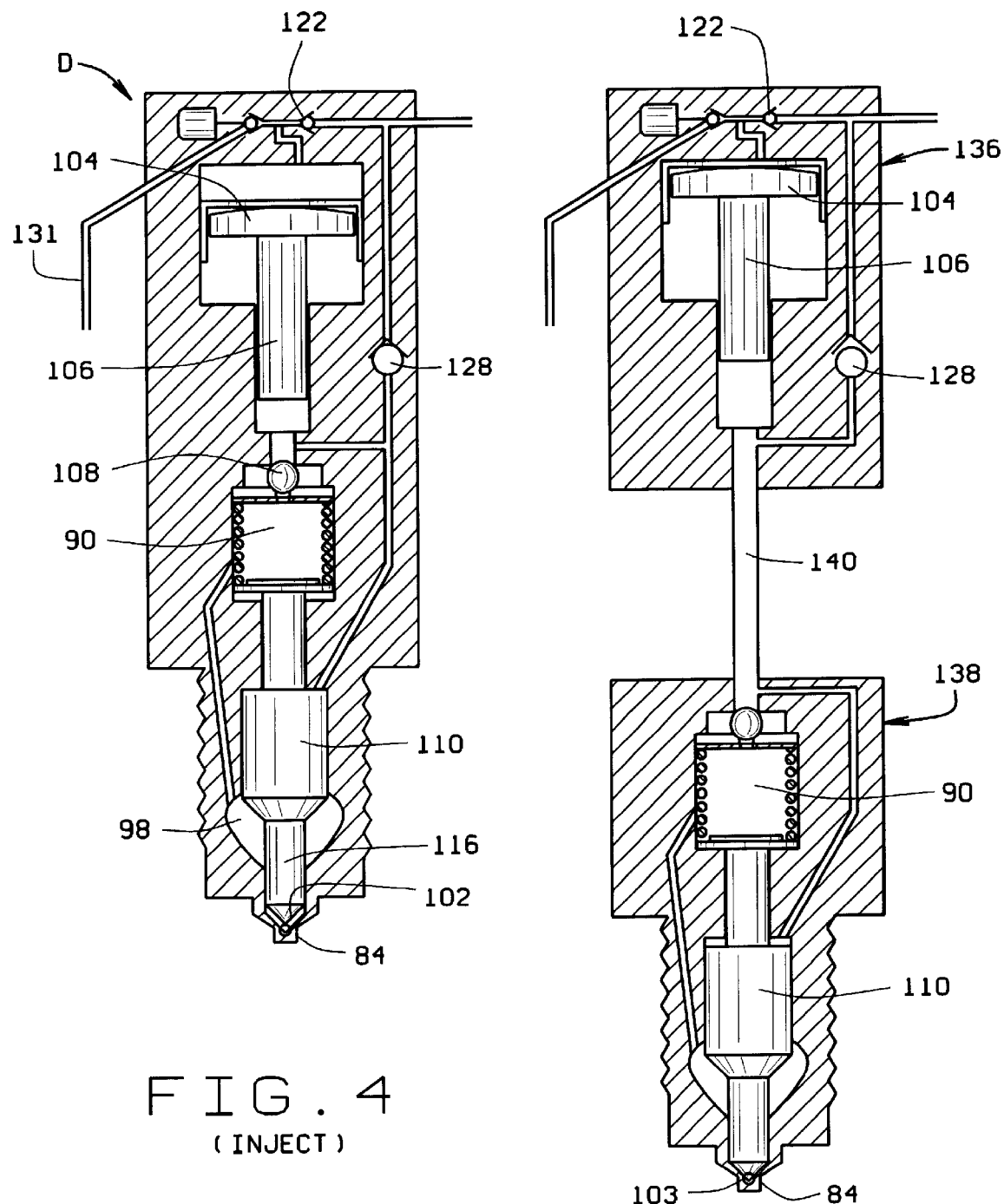
FIG. 4 is a schematic view in section of the injector in its inject mode.
FIG. 5 is a schematic view in section of a modified injector.

Next comes the injection event (FIG. 4) which is initiated by deenergizing the solenoid valve 122. This vents the intensifier cylinder 86 through the solenoid valve 122. The piston 104 and plunger 106 rise, causing a decay in the pressure in the region of enlarged chamber 98 that lies behind the intermediate portion 114 of the needle valve 110. But the pressure in the enlarged chamber 98 to which the other end of the intermediate portion 114 is exposed remains high inasmuch as the enlarged chamber 98 and the accumulator chamber 90 are in communication through the connecting passage 130. As a consequence of the imbalance, a lifting force develops which operates on the lower end of the intermediate portion 114 of the needle valve 110. That force lifts the needle 116 from the seat 102. The high pressure lubricant in the enlarged chamber 98 leaves the injector D through the orifice 103 in the nozzle 84 until such time as the spring 109 and lubricant at the pressure of the source restore the needle valve 110 to its original closed position. In so doing, the injector D undergoes another fill event.

The cycle repeats. Each time the solenoid valve 122 is energized, the injector D undergoes a charge event followed by an injection event, which is in turn followed by a fill event. During the injection event, the injector D discharges between 0.1 and 0.001 ml of lubricant, and preferably about 0.003 ml. In any event the discharge from the nozzle 84 occurs at high velocity—a velocity great enough to project the lubricant 50 to 100 mm. The lubricant leaves the orifice 103 of the nozzle 84 as an elongated drop or very small stream.

The injector D along its reduced end 82 threads into the housing C where it is located with the orifice 103 of its nozzle 84 directed laterally with respect to the axis of the injector D and aligned with the annular space between the retaining rib 18 on the cone 2 and the small end ring 42 of the cage 8 (FIG. 1). Indeed, with each discharge by the injector D a measured quantity of high performance lubricant passes through this space at the small ends of the tapered rollers 6 which are in the annular space between the tapered raceways 14 and 30 of the bearing A. Preferably this occurs with the bearing A in operation, so that the rotating rollers 6 spread the grease over the tapered raceways 14 and 30 of the cone 2 and cup 4, respectively, and over their own side faces 34 as well. The rollers 6 inherently pump the lubricant up the raceways 14 and 30 to the thrust rib 16. Here the lubricant coats the critical rib face 20 as well as the large end faces 36 of the rollers 6 which are in sliding contact with the rib face 20.

The injector D is energized only with a frequency necessary to provide the minimal amount of lubricant to keep the bearing A from failing, which is in essence the amount of lubricant required to prevent excessive friction from developing between the large end faces 36 of the rollers and the rib face 20 of the thrust rib 16. That frequency may range between once every few days to once every few months. Certainly, the frequency is short enough to maintain the film of boundary layer lubrication along the raceways 14 and 30 and the face of the thrust rib 16 so as to prevent failure of or damage to the bearing A, yet is infrequent enough to prevent lubricant from accumulating in the bearing A.

Rather than energizing the injector D at periodic intervals which are spaced to reflect the estimated depletion of lubricant at critical surfaces in the bearing A, the intervals may be spaced to accommodate the actual need for lubrication. In order to determine the actual need for lubrication, various operating parameters may be monitored. For instance, since a rise in temperature signifies the depletion of lubricant in the bearing A, the injector D may be energized when the bearing A experiences a prescribed elevation in its operating temperature. To this end this bearing A would be equipped with a temperature sensor, preferably located at the thrust rib 16 of the cone 2, inasmuch as the rib face 20 of that rib 16 represents the most critical surface in the bearing A. Speed could also be factored into the selection of the time to energize the injector D, with the frequency increasing with speed, all to optimize the injection of lubricant and the supply of lubricant in the bearing A. Furthermore, as operation of the bearing results in depletion of lubricant, the selection of the time to energize the injector D may incorporate a tabulation of actual running time of the bearing subsequent to each injection of lubrication.

Owing to the relatively little lubricant in the bearing A, not enough lubricant exists to be worked at the raceways 14 and 30. That which is present produces a boundary layer film that is thinner than the EHD film produced by conventional greases and oils. The high performance lubricant thus does not undergo a significant rise in temperature. Since the bearing A receives only a small amount of lubricant at selected intervals, and is not packed with grease, extended break-in periods for the lubricant are not necessary. Indeed, the small amount of lubricant that is injected each time the injector D is energized breaks in almost immediately.

Where the housing C cannot accommodate the elongated body 80 in its entirety, the body 80 may be separated into two components 136 and 138 (FIG. 5) with the intensifier piston 104 and plunger 106 as well as the solenoid valve 122 in the component 136 and the accumulator chamber 90, needle valve 110 and nozzle 84 in the other component 138. The passage 92 takes the form of a tube 140 connecting the two components 136 and 138.

Figure 6:
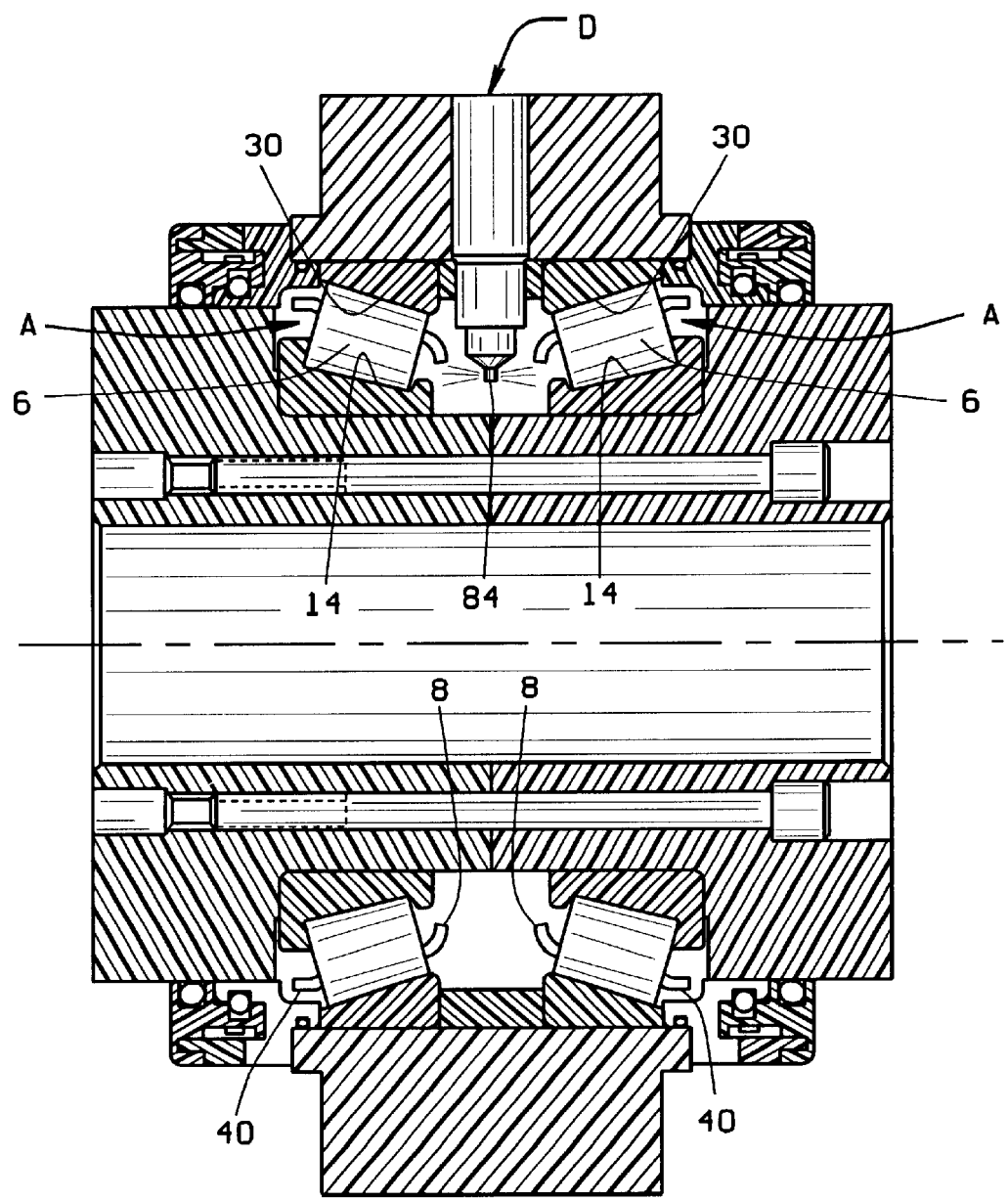
FIG. 6 is a sectional view of two bearings lubricated by a single injector.

A single injector D may service two single row tapered roller bearings A mounted close together in the indirect configuration (FIG. 6). In such an arrangement the nozzle 84 of the injector D contains two orifices 103 which direct the lubricant in two directions 180° from each other. The discharge in one direction passes into the space between the raceways 14 and 30 of the one bearing A, while the discharge in the other direction passes into the space between the raceways 14 and 30 of the other bearing A The injector D may also be located at the large ends of the raceways 14 and 16 for the bearing A. At this location it would direct the grease beneath the large end ring 40 of the cage 8 and against the large end faces 36 of the rollers 6 which would transfer the grease to the rib face 20.

Figure 7:
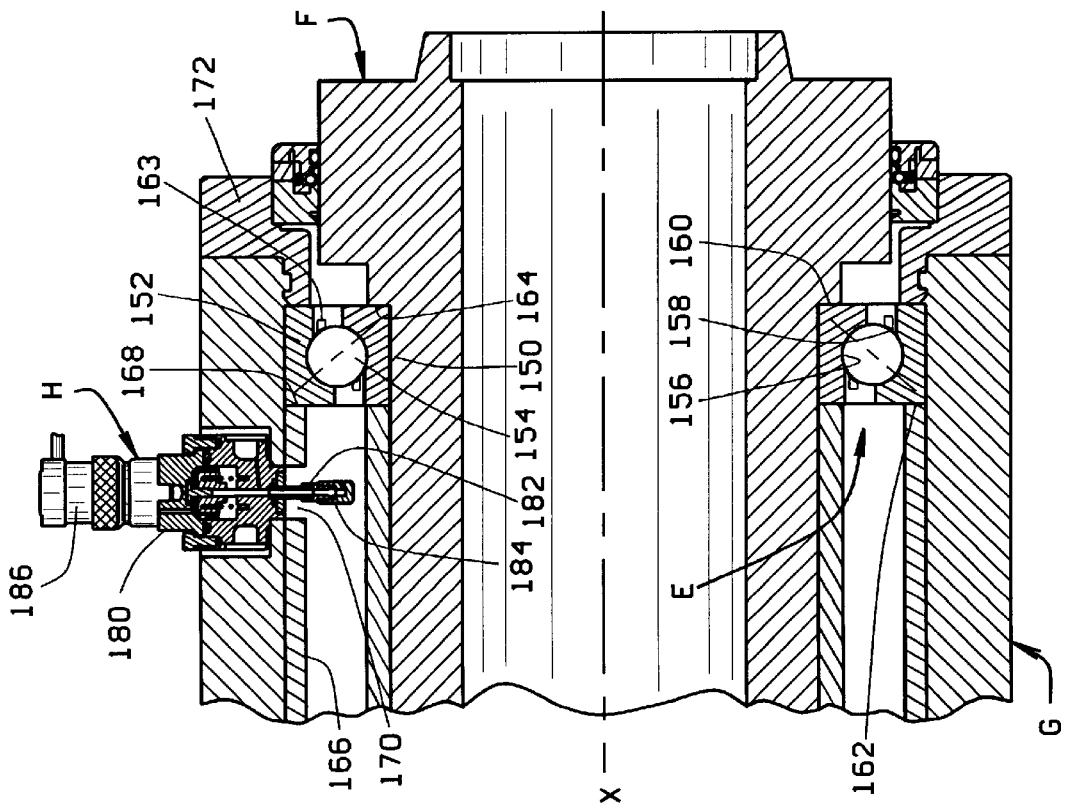
FIG. 7 is a sectional view of a spindle supported in a housing on an angular contact ball bearing, with the bearing receiving its lubrication from a modified injector.

An angular contact ball bearing E (FIG. 7), which likewise supports a spindle F in a housing G, also functions well with minute quantities of a high performance lubricant introduced into the bearing E at selected intervals with an injector H to provide critical surfaces of the bearing E with a film of boundary layer lubrication. The bearing E is mounted in the nose position in opposition to another angular contact ball bearing that is located between the spindle F and the housing G in the tail position, so that the two bearings take radial as well as thrust loads. The two bearings are set to a condition of preload. Actually more than one bearing E may be used in each position.

The bearing E includes (FIG. 7) an inner race 150 which fits around the spindle F and an outer race 152 which fits into the housing G, in both instances with interference fits. In addition, the bearing E has rolling elements in the form of balls 154 located in a circular row between the races 150 and 152. The inner race 150 has a raceway 156 which is presented outwardly away from the axis X, whereas the outer race 152 has a raceway 158 which is presented inwardly toward the raceway 156 of the inner race 150. Both raceways 154 and 156 are arcuate in cross section and generally conform to the contour of the balls 154. Actually, the balls 154 contact the raceways 156 and 158 in regions that are offset axially with respect to each other, so that the active regions of the raceways 156 and 158 are oriented obliquely with respect to the axis X. This enables the bearing E to carry radial loads as well as thrust loads in the direction which causes the balls 154 to seat more tightly against the raceways 156 and 158. That thrust load is transferred to the bearing E at an end face 160 on the inner race and an end face 162 on the outer race 152. The bearing E also has a cage or retainer 163 for maintaining the proper spacing between the balls 154.

The inner race 150 fits over the spindle F with its end face 160 against a shoulder 164 on the spindle F. The outer race 152 fits into the housing G with its end face 162 against a spacer 166 that extends to the outer race of the other bearing in the housing G. The end of the spacer 166 forms another shoulder 168, and near that shoulder 168 the spacer 166 contains an opening 170 which is presented upwardly. At its nose end the housing G is fitted with an end ring 172 which is secured with machine screws, and the outer race 152 for the bearing E lies captured between the shoulder 168 on the spacer 166 and the end ring 172.

When the spindle F rotates in the housing G, the balls 154 roll along the raceways 156 and 158 and transmit radial loads as well as thrust loads between the spindle F and housing G. To prevent scoring along the raceways 156 and 158 and along the spherical surfaces of the balls 154, and to prevent welding of the surface finish asperities along these critical surfaces, the bearing E should contain a lubricant. And when the spindle F operates at high speeds, a film of boundary layer lubrication provides the lubrication for the bearing E.

The injector H, which is highly compact, delivers such a lubricant to the bearing E in minute quantities on the order of 0.003 ml. It takes the form of an intensifier which is electrically controlled and relies on relatively low pressure air at perhaps 80 lbs/in$^2$ gauge to discharge a minute quantity of lubricant—and air at that pressure is readily available at most locations where one would expect to use the bearing E. Basically, the injector H includes (FIGS. 8 & 9) a body 180 which is mounted on the housing G, a transfer tube 182 which extends from one end of the body 180 into the housing G and through the opening 170 in the spacer 166. At its end, the transfer tube 182 is fitted with a nozzle 184 which lies opposite the balls 154 of the bearing E. In addition, the injector H has a solenoid valve 186 attached to the other end of the body 180.

The body 180 of the injector H contains an intensifier cylinder 188 and a plunger cylinder 190 that leads from the intensifier cylinder 188 to the transfer tube 182. The intensifier cylinder 188 holds an intensifier piston 192 which is connected to a plunger 194 that extends into the plunger cylinder 190. The piston 192 and plunger 194 move in unison between extended and retracted positions in their respective cylinders 188 and 190. The intensifier cylinder 188 also contains a coil-type return spring 196 which urges the intensifier piston 192 and the plunger 194 to their retracted positions, that is to say, to the positions in which the piston 192 and plunger 194 are farthest from the transfer tube 182. The intensifier piston 192 does not wipe the wall of the intensifier cylinder 190, but nevertheless is sealed with respect to that wall by a rolling diaphragm seal 198.

The body 180 also contains an annular lubricant reservoir 200 which surrounds the plunger cylinder 190 and at its lower end is connected to the remote or lower end of the plunger cylinder 190 through a supply passage 202 (FIG. 9). The plunger 194 lies beyond the location at which the supply passage 202 opens into the plunger cylinder 190 when the plunger 194 is in its retracted position, but not when the plunger 194 is in its extended position. The lubricant reservoir 200 holds a supply of high performance lubricant.

In addition, the body 180 has an air inlet port 204 which is connected to a source of air that is pressurized on the order of 80 lbs/in² gauge. The inlet port 204 opens into an air passage 206 which leads to the solenoid valve 186 and to the upper end of the lubricant reservoir 200 (FIG. 8). The solenoid valve 186 is connected to the end of the intensifier cylinder 188 through another air passage 208 (FIG. 9). When the solenoid valve 186 is energized, it places the two air passages 206 and 208 in communication, so that pressurized air enters the intensifier cylinder 188 above the intensifier piston 192.

The transfer tube 182 extends from the lower end of the body 180 where it aligns with the plunger cylinder 190 in the body 180. The intensifier piston 192 will bottom out in its extended position in the intensifier cylinder 188 before the plunger 194 reaches the transfer tube 182 at the end of the plunger cylinder 190.

The nozzle 184 contains a check valve 210 which does not open until the pressure of the lubricant in the transfer tube 182 exceeds a predetermined magnitude on the order of 5,000 lbs/in² or more. The nozzle 184 contains a discharge orifice 212 which is directed laterally with respect to the tube 182 and toward the annular space between the inner race 150 and outer race 152. The balls 154 of course occupy that space.

When the bearing E is scheduled for relubrication, pressurized air on the order of 80 lbs/in² gauge is admitted to the air inlet port 204. Since the inlet port 204 is in direct communication with the lubricant reservoir 200, the pressure of the lubricant in the reservoir 200 as well as in the transfer tube 182 equalizes with that of the air. But that pressure is not enough to open the check valve 210 so no lubricant escapes from the nozzle 184.

To inject a minute quantity of lubricant on the order of 0.003 ml into the bearing E, the solenoid valve 186 is energized. It admits pressurized air to the intensifier cylinder 188 above the intensifier piston 192. The pressurized air drives the intensifier piston 192 and with it the plunger 194, toward their extended positions. The plunger 194 moves through the plunger cylinder 190, and after passing the supply passage 202 it compresses the lubricant that lies within the plunger cylinder 190 and transfer tube 182 between the supply passage 202 and the check valve 210. Owing to the differences in diameter between the intensifier piston 192 and the plunger 194, the pressure of the lubricant in the transfer tube 182 rises to a magnitude considerably higher than that of the air behind the intensifier piston 192. Indeed, the pressure of the lubricant in the transfer tube 182 exceeds the capacity of the check valve 210 to restrain it. The check valve 210 opens and the high pressure lubricant flows past it and out of the orifice 212. Owing to its elevated pressure, the lubricant is projected into the space between the two races 150 and 152 and onto the balls 154. The relubrication should occur while the bearing E is in operation, so that the balls 154 will distribute the minute quantity of lubricant over the raceways 156 and 158. In a larger bearing E, several actuations of the solenoid valve 186 may be required at the relubrication interval to supply enough lubricant to relubricate the bearing E.

Figure 10:
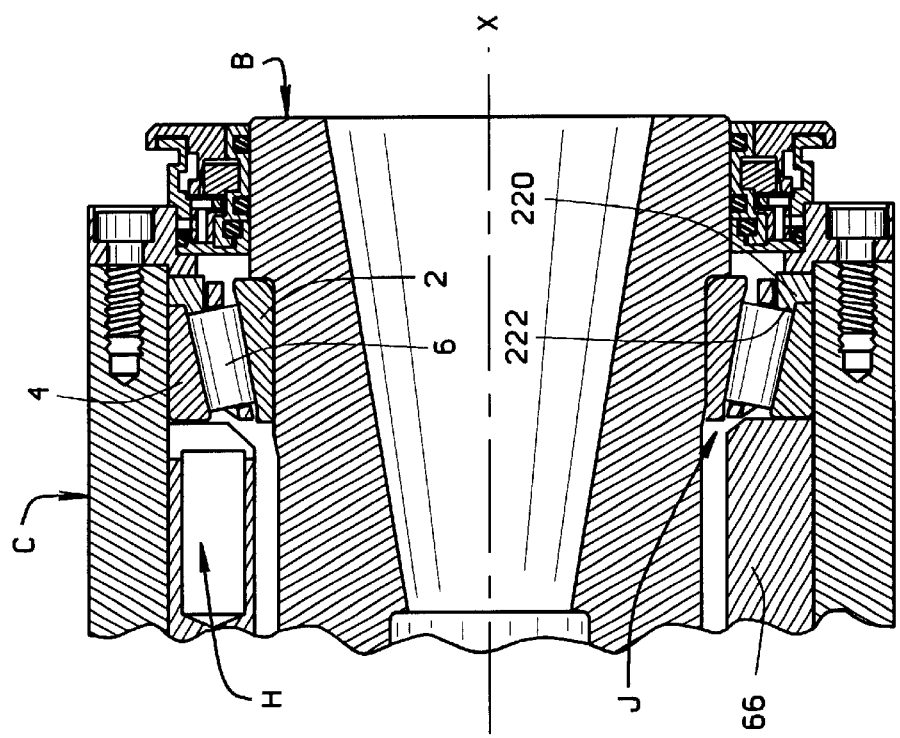
FIG. 10 is a sectional view of a spindle supported in a housing on a modified tapered roller bearing, with the bearing receiving its lubrication from another modified injector.

The spindle B may be supported on a modified tapered roller bearing J (FIG. 10) that differs from the bearing A in that it has a rib ring 220 located at that end of the cup 4 out of which the large end of the cup raceway 30 opens. The rib ring 220 carries a thrust rib 222 which lies along the large end of the cup raceway 30. The large end faces of the rollers 6 bears against the thrust rib 222. The cone 2, on the other hand, has no thrust rib. The injector H or at least a component of it may be incorporated into the spacer 66 that positions the cup 4. When energized, the injector H discharges lubricant into the space between the cone 2 and cup 4, and the rollers 6 distribute that lubricant over the raceways 14 and 30 and along the face of the thrust rib 222.

Still another injector I (FIGS. 11 & 12), which is even more compact than the injector H, may be installed over the housing G to lubricate the bearing E. The configuration of injector I allows the solenoid valve (not pictured) to be remotely located. Accordingly, the injector I has a body 230 which may be somewhat smaller than the body 180 of the injector H, but nevertheless, has an injector tube 182 extended from one end of the body 230 and into the housing G. The tube 182 terminates at a nozzle 184 containing a spring-loaded check valve 210 and a laterally directed orifice 212 beyond the check valve 210.

Like the body 180 of the injector H, the body 230 of the injector I encloses an intensifier cylinder 188 and a plunger cylinder 190 that are axially aligned. The plunger cylinder 190 leads from the intensifier cylinder 188 to the transfer tube 182. The intensifier cylinder 188 contains an intensifier piston 192, whereas the plunger cylinder 190 contains a plunger 194 which is coupled to and driven by the intensifier piston 192. Thus, the piston 192 and the plunger 194 move in unison through their respective cylinders 188 and 190 between extended and retracted positions. The intensifier cylinder 188 also contains a return spring 196 which acts on the intensifier piston 192 and urges the piston 192 and plunger 194 to their retracted positions. While loosely fitted into the intensifier cylinder 188, the intensifier piston 192 is nevertheless sealed to the wall of the cylinder 188 with a rolling diaphragm seal 198.

The intensifier cylinder 188 behind the piston 192 communicates with an air inlet port 232 which is in turn connected with a source of air pressurized at perhaps 80 lbs/in². The line which couples the port 232 with the source of air contains an electrically activated valve. The opposite end of the intensifier cylinder 188 communicates with a vent 234. The plunger cylinder 190 between its ends has a lubricant supply passage 236 opening into it, and the passage 236 in turn is connected to a lubricant port 238. The port 238 is connected to a source of lubricant which is slightly pressurized to ensure that it will flow into the port 238 and the passage 236, but the pressure is not great enough to unseat the check valve 210. When the intensifier piston 192 and plunger 194 are retracted, the end of the plunger 194 lies beyond the supply passage 236, thus exposing the end of the passage 236 to the plunger cylinder 190. However, when the piston 192 and plunger 194 are extended, the plunger 194 closes the end of the passage 236.

The injector I functions essentially the same as the injector H. When the valve in the line leading to the air inlet port 232 is energized, pressurized air enters the intensifier cylinder 188 behind the intensifier piston 192. The air drives the piston 192 and plunger 194 toward their extended positions. The end of the plunger 194 passes the supply passage 236, beyond which it forces the trapped lubricant in the cylinder 190 and connected transfer tube 182 toward the nozzle 184. The pressure imparted to the lubricant unseats the check valve 210, causing a small quantity of lubricant to leave the nozzle 184 at the orifice 212.

The injectors D, H and I may be used to lubricate other types of antifriction bearings, such as cylindrical or spherical roller bearings. Of course, the injector D may be used with the bearing E and the injector H with the bearing A. Indeed, any one of the injectors D, H or I may be used in other machine components to lubricate critical surfaces in such components—surfaces where friction between them might damage the components. Typical surfaces might be on a cam and follower, or on the faces on the flanks of meshing gear teeth, or on the contacting friction surfaces of traction drives. Generally speaking, the critical surfaces of these machine components require larger discharges of lubrication, perhaps up to 0.1 ml with each actuation of the injector D, H or I and actuation at more frequent intervals.

This invention is intended to cover all changes and modifications of the example of the invention herein chosen for purposes of the disclosure which do not constitute departures from the spirit and scope of the invention.

What is claimed is:

1. The combination comprising: an antifriction bearing that facilitates rotation about an axis and has a first race provided with a raceway, a second race provided with a raceway that is presented toward, yet spaced from, the raceway of the first race, and rolling elements located between the races and contacting the raceways; and: an injector provided with a nozzle having an orifice that is directed toward the space between the raceways, the injector when activated having the capacity to inject a minute quantity of lubricant into the space so that the lubricant produces a thin film on the rolling elements and raceways.

2. The combination according to claim 1 wherein the injector when activated injects generally less than 0.1 ml. of lubricant into the space.

3. The combination according to claim 2 further comprising a boundary layer film of lubricant on the raceways and rolling elements of the bearing, and the injector when activated injects the same lubricant into the space between the raceways.

4. The combination according to claim 3 wherein the lubricant is a high performance grease.

5. The combination according to claim 1 wherein the first raceway is presented generally away from the axis and the second raceway is presented generally toward the axis; and wherein the raceways are generally oblique to the axis, so that the bearing will take radial and axial loads.

6. The combination according to claim 5 wherein the raceways are tapered and lie within conical envelopes having their apices at a common point along the axis; wherein the rolling elements are tapered rollers having side faces that contact the raceways and large end faces; wherein the bearing further includes a thrust rib located at the large end of one of the tapered raceways and having a rib face against which the large ends of the tapered rollers bear; and wherein the lubricant produces a film along the rib face as well.

7. The combination according to claim 5 wherein the raceways are arcuate in cross section and the rolling elements are balls that seat against the raceways of the first and second races in regions that are axially offset from each other, so that the bearing will take radial and axial loads.

8. The combination according to claim 5 wherein the rolling elements are under preload.

9. The combination according to claim 1 wherein the injector further comprises a body containing an intensifier cylinder, a plunger cylinder that is smaller in diameter than the intensifier cylinder, an accumulator chamber that communicates with the plunger cylinder and with the nozzle, an intensifier piston movable in the intensifier cylinder, and a plunger movable in the plunger cylinder, with the plunger being connected to and movable with the intensifier piston, the body further containing passageways for directing pressurized lubricant to the intensifier cylinder behind the intensifier piston and the plunger cylinder ahead of the plunger, the arrangement being such that when the pressurized lubricant enters the intensifier cylinder it displaces the intensifier piston and the plunger moves and forces lubricant at a greater pressure into the accumulator, and a valve for releasing the higher pressure lubricant from the accumulator so that it will flow to the nozzle to be discharged in a small quantity from the nozzle.

10. The combination comprising: a housing; a spindle located within the housing; an antifriction bearing supporting the spindle in the housing for rotation in the housing about an axis, the bearing including an inner race located on the spindle and having a raceway presented away from, yet oblique to the axis, an outer race located in the housing and having a raceway that is presented toward, yet oblique to, the axis and surrounding the inner race, and rolling elements located between the races and contacting the raceways; a lubricant coating the raceways and rolling elements of the bearing; and an injector located on the housing and having a nozzle provided with an orifice that is directed toward the rolling elements of the bearing, the injector when activated having the capacity to discharge a minute quantity of lubricant into the bearing at selected intervals to replenish the lubricant into the bearing without excessively accumulating lubricant in the bearing.

11. The combination according to claim 10 wherein the injector when activated discharges generally less than 0.1 ml of lubricant toward the rolling elements of the bearing.

12. The combination according to claim 11 wherein the lubricant is high performance grease.

13. The combination according to claim 10 wherein the raceways of the bearing are tapered and lie within conical envelopes having their apices located at a common point along the axis; wherein the rolling elements of the bearing are tapered rollers having side faces which contact the raceways and large end faces; wherein the bearing further includes a thrust rib at the large end of one of the tapered raceways, with the thrust rib having a rib face against which the large end faces of the tapered rollers bear; and wherein the lubricant coats the rib face.

14. The combination according to claim 13 wherein the nozzle of the injector is directed toward the small ends of the tapered rollers.

15. The combination according to claim 10 wherein the raceways are arcuate in cross section and the rolling elements are balls that seat against the raceway of the first and second races in regions that are axially offset from each other, so that the bearing will take radial and axial loads.

16. The combination according to claim 10 wherein the injector further comprises a body containing an intensifier cylinder, a plunger cylinder that is smaller in diameter than the intensifier cylinder, an accumulator chamber that communicates with the plunger cylinder and with the nozzle, an intensifier piston movable in the intensifier cylinder and a plunger movable in the plunger cylinder, with the plunger being connected to and movable with the intensifier piston, the body further containing passageways for directing pressurized lubricant to the intensifier cylinder behind the intensifier piston and to the plunger cylinder ahead of the plunger, the arrangement being such that when the pressurized lubricant enters the intensifier cylinder it displaces the intensifier piston and the plunger, and the plunger forces lubricant at a greater pressure into the accumulator, and a valve for releasing the higher pressure lubricant from the accumulator so that it will flow to the nozzle to be discharged in a small quantity from the nozzle.

17. The combination according to claim 10 wherein the injector includes a body containing an intensifier cylinder, a smaller plunger cylinder that opens into the intensifier cylinder, and a supply passage that communicates with a source of lubricant and opens into the plunger cylinder remote from the intensifier cylinder, an intensifier piston in the intensifier cylinder and a plunger in the plunger cylinder, the intensifier piston and the plunger being joined together and movable in unison between a retracted position, wherein the plunger lies beyond the supply passage, and an extended position, wherein the plunger lies over and closes the supply passage; a port communicating with a source of pressurized gas for admitting the pressurized gas to the intensifier cylinder behind the intensifier piston so as to move the intensifier piston and plunger to their extended positions, whereby the plunger cylinder forces lubricant out of the plunger cylinder and toward the nozzle, and a check valve located between the plunger cylinder and the orifice of the nozzle for releasing the lubricant to the orifice only after the lubricant in the plunger cylinder reaches a predetermined pressure.

* * * * *